Feb. 18, 1969

R. J. JACKSON ET AL 3,427,895

SPLITTER DAMPER LINKAGE

Filed Oct. 10, 1966

Inventors
Roy James Jackson
Peter James Brooks

By Watson, Cole, Grindle & Watson
Attorneys

3,427,895
SPLITTER DAMPER LINKAGE
Roy J. Jackson, 4 Lachlan Grove, Carlingford, New South Wales, Australia, and Peter J. Brooks, 40 Wellington Road, East Lindfield, New South Wales, Australia
Filed Oct. 10, 1966, Ser. No. 585,524
Claims priority, application Great Britain, Oct. 14, 1965, 43,618/65
U.S. Cl. 74—503                                                    4 Claims
Int. Cl. F16h *21/44, 21/54;* G05g *1/00*

ABSTRACT OF THE DISCLOSURE

A splitter damper linkage of the type used on air conditioning ducts is disclosed. The linkage includes a flap for directing air flow, a tumbler assembly arranged for mounting on the duct and a blade clevis for mounting on the flap. The flap is moved in relation to the duct by an actuating rod which is pivotally mounted with respect to the flap and pivotally and slidably mounted with respect to the tumbler assembly.

---

This invention relates to a splitter damper linkage.

The object of the present invention is to provide a simplified damper operating mechanism which is positive in action, airtight, does not require positional indication means and is easier to install.

The present invention is particularly applicable to air conditioning ducting where a branch line enters a main line and provides for control of the opening of the branch line.

The invention provides a splitter damper linkage comprising a blade clevis for mounting on a flap, a tumbler assembly for mounting on a duct or vice versa, an actuating rod journalled for pivotal movement with respect to the blade clevis and the tumbler assembly and for sliding movement with respect to the tumbler assembly and means for locking the actuating rod with respect to the tumbler assembly to maintain the flap in a selected position.

Figure 1:
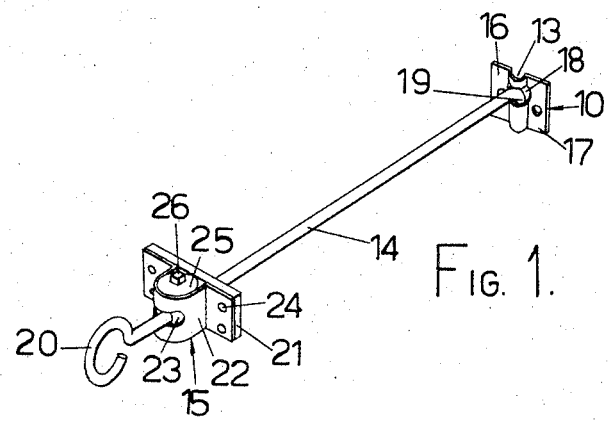
Figure 2:
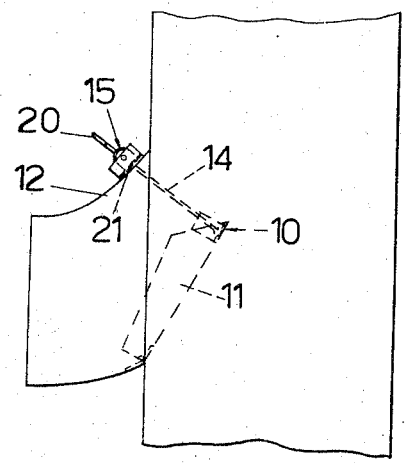

The invention is hereinafter described with reference to the accompanying drawings in which:

FIGURE 1 is a perspective view of the splitter damper linkage of this invention, and FIGURE 2 is a plan view of the linkage of FIGURE 1 installed in a duct system.

A tail bracket or blade clevis 10 is arranged to be mounted on a member 11, which is pivotally mounted on a duct 12. The blade clevis 10 is saddle shaped and has a channel 13 in which an actuating rod 14 is journalled, the rod 14 being arranged to extend through the duct 12 on which a tumbler block assembly 15 is positioned.

The blade clevis is formed from steel sheet and in end elevation presents two flat portions 16 with an arcuate channel portion 13 therebetween. Screw holes 17 are provided in each flat portion for fixing purposes. A slot 18 is provided in the channel portion and extends into the marginal flat portions so as to provide an opening to receive a hooked end portion 19 of the actuating rod 14. The slot 18 is positioned adjacent one end of the blade clevis when mounted so as to increase the bearing area available to the end portion 19 of the rod 14.

The actuating rod 14 has at one end the aforementioned hooked end portion 19 which is transverse to the main portion of the rod and it terminates at the other end in a loop 20 which serves as a hand grip.

The tumbler block assembly 15 includes a felt or similar washer 21 positioned on the actuating rod 14 and clamped to the duct 12 by a saddle bracket 22 similar to but larger in size than the blade clevis 10. The transverse slot 23 in the bracket 22 is normally centrally disposed and is of shorter length than is the slot 18. Screw holes 24 are also provided in the saddle 22 and the felt washer 21.

A tumbler block 25 is journalled in the arcuate channel 26 of the saddle bracket 22. It is of cylindrical construction with a diametrical bore in which the main part of the actuating rod 14 is slidably mounted. An axial threaded bore from one end intersects the diametrical bore and receives a screw member 26 which serves to lock the actuating rod in a selected position with respect to the tumbler block.

The duct 12 is slotted in the direction of pivotal movement so as to accommodate the movement of the actuating rod 14.

We claim:
1. A splitter damper linkage comprising a blade clevis for mounting on a flap, said blade clevis being saddle shaped in cross-section and comprising two planar parts with an arcuate portion therebetween, said arcuate portion having a transverse slot; a tumbler assembly for mounting on a duct, said tumbler assembly comprising a saddle shaped member having an arcuate portion with a slot therein and planar portions on each side and a tumbler block comprising a cylindrical member journalled in the arcuate portion and having a diametrically positioned hole aligned with the slot in said saddle; an actuating rod slidably passing through the hole in said tumbler block and slot in said saddle and having a bent portion at one end thereof inserted for pivotal movement in the transverse slot of the arcuate portion of said blade clevis; and means for locking the actuating rod relative to said tumbler assembly to maintain the flap in a selected position.

2. A splitter damper linkage as claimed in claim 1 in which said means for locking the actuating rod comprises an axial threaded hole in the tumbler block intersecting said diametrically positioned hole and a stud screwed into said threaded hole which may be brought into engagement with the actuating rod passing through said diametrical hole to lock the actuating rod in any desired position.

3. A splitter damper linkage as claimed in claim 1 comprising a felt washer positioned between the tumbler block assembly saddle and the flap on which it is mounted, said actuating rod passing through said felt washer.

4. A splitter damper linkage as claimed in claim 3 wherein the distal end of the actuating rod has a handle gripping portion.

References Cited
UNITED STATES PATENTS
820,581   5/1906   La Londe _____ 74—503 XR
1,125,953   1/1915   Brown _____ 292—275

HALL C. COE, *Primary Examiner.*

U.S. Cl. X.R.
74—103; 292—275